United States Patent Office 3,390,967
Patented July 2, 1968

3,390,967
CARBIDE HARD ALLOYS FOR USE IN
WRITING INSTRUMENTS
Fritz Frehn, Krefeld, Germany, assignor to Deutsche
Edelstahlwerke Aktiengesellschaft, Krefeld, Germany
No Drawing. Filed Feb. 6, 1967, Ser. No. 614,032
Claims priority, application Germany, Mar. 8, 1966,
D 49,533
4 Claims. (Cl. 29—182.7)

ABSTRACT OF THE DISCLOSURE

An alloy of titanium carbide/chromium carbide mixed crystals, in a chromium/possibly molybdenum/possibly copper alloy steel, is particularly suitable for the manufacture of tubes of tube writing pens and balls of ball point pens.

---

The invention relates to the use of a carbide hard alloy for parts subject to wear in writing utensils, particularly for writing tubes in tube writing pens, and balls in ball point pens.

The writing tubes of tube writing pens and the balls of ball point pens are exposed to considerable wear during the process of writing. A material for making such components, in addition to a high resistance to wear, is required to have satisfactory sliding properties, corrosion resistance and ready machinability.

The invention provides a carbide hard alloy for the production of such parts, the said hard alloy consisting essentially of 25 to 35% of a crystalline carbide mixture in the form of titanium carbide/chromium carbide mixed crystals containing 50 to 75% by weight, based on the total crystal mixture of chromium carbide and 25 to 50% by weight of titanium carbide; and of 65 to 75% of a steel alloy comprising

| | Percent by weight |
|---|---|
| Carbon | 0.25–0.7 |
| Copper | 0–2 |
| Chromium | 10–18 |
| Molybdenum | 0–1 |

Remainder consisting essentially of iron.

A carbide hard alloy of the above specified kind satisfies all the requirements of writing tubes of tube writing pens and the balls of ball point pens. It is wear and corrosion resistant, and when annealed the semi-finished components made of the said alloy are readily machinable and the finished products can be hardened if desired. Owing to the rounded shape of the carbides and the spherical pearlitic structure of the steel matrix, the alloy possesses exceptionally good sliding properties and it is also in this respect particularly suitable for the contemplated purpose.

A hard metal which conventionally consists of a carbide, such as tungsten carbide and a metal binder phase, such as iron, nickel or cobalt, would not be so suitable as the alloy of the invention for such purposes, because the angular configurations of the tungsten carbide due to its hexagonal lattice and the soft greasy metal binder phase do not make for good sliding properties combined with abrasion resistance. The scratchy angular carbide grains partly project from the surface of the writing tube or of the ball when these have been worn and prevent the tube or ball from sliding easily over the paper surface.

The slidability of an abrasion-resistant part of a writing utensil made of the alloy according to the invention is further improved by controlling the grain size of the end product, by grinding, mixing and sintering initial materials of a grain size of 2 to 5µ, whereby the grain size of the final sinter does not exceed 5 to 8µ.

Parts for writing utensils thus produced satisfy all the above mentioned requirements. The blanks produced from the carbide hard alloy can be machined when annealed, for instance by turning, grinding and polishing them, just as readily as by electron beam boring or by spark erosion. For the production of very small internal bores of say 0.15 mm., electron beam boring will be preferred to spark erosion because the machining times are shorter than in spark erosion although this is also a suitable technique for producing such small bores.

When finish-machined, the material can be hardened without impairment of the dimensional accuracy of writing parts made therefrom. It has been found that the compressive strength of the carbide hard alloy according to the invention when annealed is about 25% higher than when it is in the hardened state. When annealed the carbide hard alloy has a compressive strength of about 200 kg./sq. mm., whereas in the hardened state the figure is about 145 kg./sq. mm. Since in this type of wear compressive strength is a measure of the wear resistance of the material it is advisable to use writing tubes made of the proposed carbide hard alloy in the annealed state. This simplifies manufacture and provides an article of better properties.

What is claimed is:

1. A sintered carbide hard alloy consisting essentially of 25 to 35% by weight of a crystalline carbide mixture in the form of titanium carbide/chromium carbide mixed crystals containing 50 to 75% by weight, based on the total crystal mixture of chromium carbide and 25 to 50% by weight of titanium carbide; and of 65 to 75% of a steel alloy comprising

| | Percent by weight |
|---|---|
| Carbon | 0.25–0.7 |
| Copper | 0–2 |
| Chromium | 10–18 |
| Molybdenum | 0–1 |

Remainder consisting essentially of iron.

2. A sintered carbide hard alloy according to claim 1, in which the grain size of the final product is within the range 5 to 8µ.

3. A tube pen writing tube made of the sintered carbide hard alloy of claim 2 and having a compressive strength of about 200 kilograms per square millimeter.

4. A ball writing pen ball made of the sintered carbide alloy of claim 2 and having a compressive strength of about 145 kilograms per square millimeter.

References Cited

UNITED STATES PATENTS

| 2,228,235 | 1/1941 | Pfanstiehl | 29—182.8 |
| 2,752,666 | 7/1956 | Goetzel et al. | 29—182.8 |
| 3,053,706 | 9/1962 | Gregory et al. | 29—182.7 |
| 3,303,825 | 2/1967 | Shuman et al. | 29—182.8 |
| 2,396,058 | 3/1946 | Rath | 401—198 |

FOREIGN PATENTS 1,039,241    9/1958    Germany.

OTHER REFERENCES

Trent et al., "High Temperature Alloys Based On Titanium Carbide," Metallurgia, August 1950, pp. 111–115.

BENJAMIN R. PADGETT, *Primary Examiner.*

L. DEWAYNE RUTLEDGE, *Examiner.*

R. L. GRUDZIECKI, *Assistant Examiner.*